United States Patent [19]
Russell, II

[11] Patent Number: 5,178,264
[45] Date of Patent: Jan. 12, 1993

[54] ROLAMITE SENSOR
[75] Inventor: Richard J. Russell, II, Sunland, Calif.
[73] Assignee: TRW Technar Inc., Irwindale, Calif.
[21] Appl. No.: 718,189
[22] Filed: Jun. 20, 1991
[51] Int. Cl.$^5$ .................... H01H 1/12; H01H 35/00
[52] U.S. Cl. .................... 200/503; 200/52 R
[58] Field of Search ............ 200/503, 52 R, 52 A, 200/61.45 R, 61.52, 277

[56] References Cited
U.S. PATENT DOCUMENTS

| | | | |
|---|---|---|---|
| 3,617,669 | 11/1971 | Maloney | 200/503 |
| 3,643,048 | 2/1972 | Crow et al. | 200/503 |
| 5,036,304 | 7/1991 | Russell et al. | 335/209 |

Primary Examiner—Henry J. Recla
Assistant Examiner—David J. Walczak
Attorney, Agent, or Firm—Tarolli, Sundheim & Covell

[57] ABSTRACT

A rolamite sensor for use in sensing deceleration of a vehicle includes two separate electrical circuits for actuating one or more occupant restraints such as air bags. The sensor has a base mounted on a chassis and a cover welded to the chassis to enclose the base. One surface of the base acts as a guide surface for a roller. A pair of thin metal bands are wrapped around the roller. The ends of the bands are fixed to the base. The roller is rollable on the guide surface under an applied force to cause the bands to engage firing contacts to complete the electrical circuits. The roller has a pair of spaced apart tubular metal caps supported on a non-conductive insert. Each band is welded to a respective one of the conductive metal caps of the roller.

10 Claims, 4 Drawing Sheets

5,178,264

ROLAMITE SENSOR

BACKGROUND OF THE INVENTION

1. Technical Field

The present invention relates to a sensor for sensing deceleration of a vehicle, and particularly to a sensor for actuating a vehicle occupant restraint such as an air bag.

2. Description of the Prior Art

Co-pending U.S. patent application Ser. No. 500,691, filed Mar. 28, 1990 and assigned to the assignee of the present invention, describes a sensor having a base and a roller movable on a guide surface of the base. The sensor has two independent electrical circuits. Each circuit includes a flexible metallic band which wraps around the roller. Each band has its ends fixed to the base. The bands are under tension and bias the roller into an initial position. Upon vehicle deceleration above a predetermined rate, the roller rolls on the guide surface out of its initial position, causing portions of the bands to engage firing contacts to complete electrical circuits within the sensor. Current flowing through these completed circuits is used to actuate a vehicle occupant restraint system such as an air bag.

In the sensor identified above, throughout the range of motion of the roller along the guide surface of the base, the bands act to bias the roller toward its initial position. A certain amount of force is needed to overcome this biasing effect to move the roller. The amounts of force needed to move the roller toward its firing contacts, at all points in the roller's range of motion along the base, constitute the sensor's force curve. If the sensor's force curve is known, the sensor can be calibrated properly so that the electrical circuits in the sensor will be completed upon experiencing vehicle deceleration of a predetermined amount. Preferably, a large number of sensors with identical known force curves can feasibly be manufactured on an automated assembly line.

It is difficult to meet these objectives using the design of the rolamite sensor identified above. Each band in that rolamite sensor includes an angled connector portion extending between two straight portions. The straight portions are parallel but non-collinear. Because the bands are under tension due to forces applied to the ends of the straight portions of the bands, a twisting moment is produced in the angled connector portion of the band. This twisting moment can result in localized elastic buckling of the band, and the band does not lie flat on the guide surface of the base. If a band is buckled, it may not be possible to predict with accuracy how much force is needed to move the roller at a given point on the surface of the base. Thus proper sensor calibration then becomes more difficult.

To minimize this problem, the connector portions of the bands of the rolamite sensor identified above have been designed with circular openings which receive projecting nubs on the surface of the roller, to retain the bands in position relative to the roller. Because of production tolerances and assembly requirements, the circular openings in the bands which receive the nubs on the roller must be significantly larger than the nubs. Consequently, the bands can still move relative to the roller in the assembled sensor. Thus, the bands are still susceptible to twisting as a result of the tension forces applied to the band ends, and the bands can still buckle.

SUMMARY OF THE INVENTION

The present invention is an apparatus comprising a movable member and a base having a guide surface defining a path along which the movable member moves. A band of flexible electrically conductive material at least partially encircles the movable member and is partially displaced upon movement of the movable member. The band is welded to the movable member. An electrically conductive member is in the path of displacement of the band at a location spaced from the movable member and the band when the movable member and band are in a first position. The movable member is movable along the guide surface from the first position to a second position in which a portion of the band contacts the conductive member to complete a circuit for electrical current through the conductive member and the band.

In a preferred embodiment of the invention the movable member is a roller having a pair of spaced apart tubular metal caps supported on a non-conductive insert. The apparatus includes two bands each of which is S-shaped and has opposite ends fixed to the base. Each band is welded to a respective one of the conductive metal caps of the roller. Rigid attachment of the bands to the roller, through welding, prevents twisting of the bands.

BRIEF DESCRIPTION OF THE DRAWINGS

Further features of the present invention will become apparent to those skilled in the art to which the present invention relates from reading the following description of a preferred embodiment of the invention with reference to the accompanying drawings, in which.

DESCRIPTION OF A PREFERRED EMBODIMENT OF THE INVENTION

The present invention relates to a sensor for sensing deceleration of a vehicle, and particularly to a rolamite sensor for actuating a vehicle occupant restraint such as an air bag. The present invention is applicable to various sensor constructions.

Figure 1:
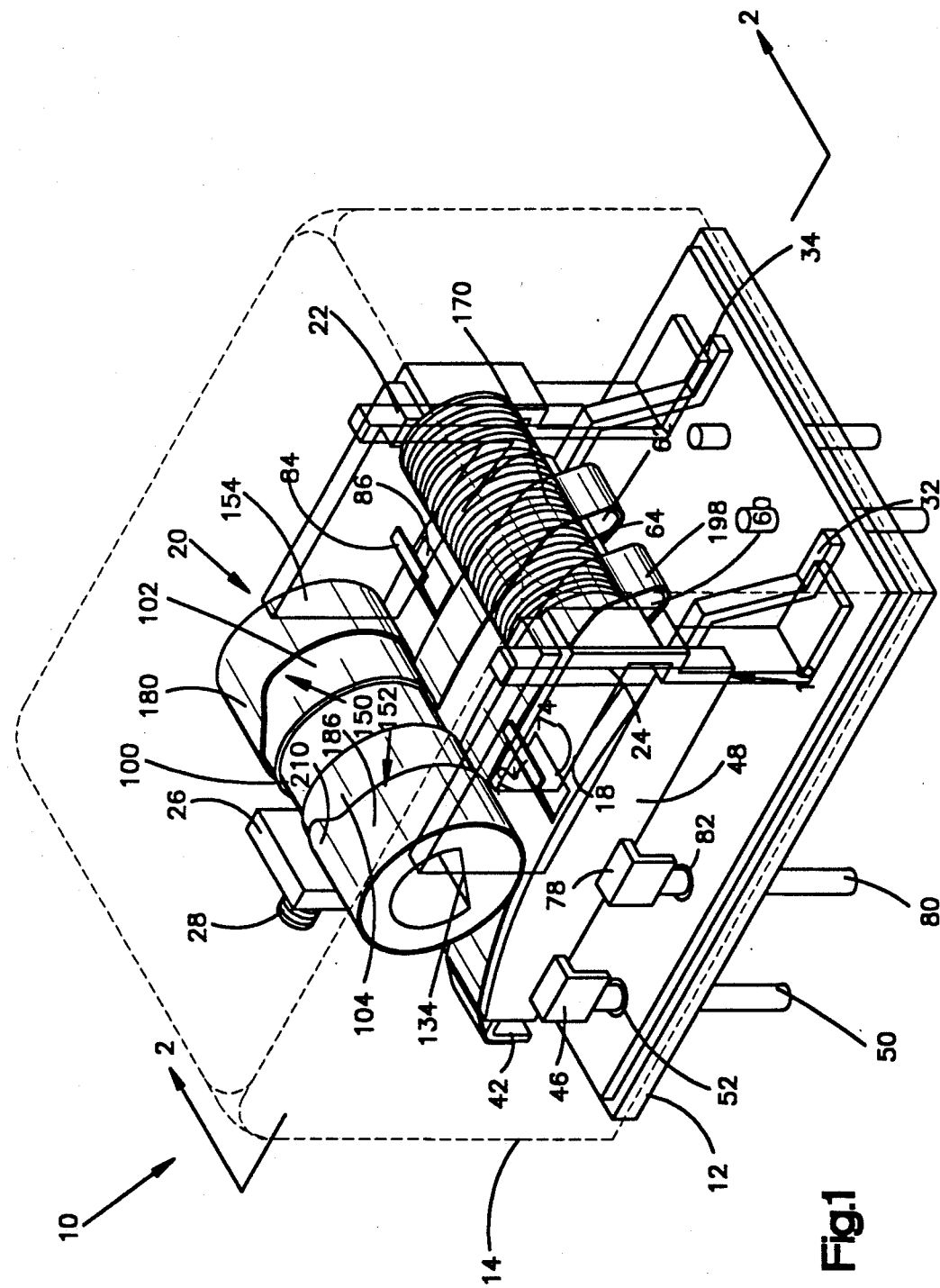
FIG. 1 is a perspective view of a rolamite sensor embodying the present invention.

As representative of the present invention, FIG. 1 illustrates a rolamite sensor 10. The sensor 10 includes a metal chassis 12 having a generally rectangular shape. A metal cover 14 is welded to the chassis 12 hermetically to seal the sensor 10. A base 16 is attached to the chassis 12 and is located inside the cover 14. The base 16 is molded from an electrically insulating plastic material. The surface of the base 16 facing away from the chassis 12 is a curved guide surface 18 which defines a path for rolling movement of a roller 20.

A pair of front stops 22 and 24 extend upwardly from the guide surface 18 of the base 16 in a direction generally perpendicular to the chassis 12. The front stops 22 and 24 are molded in one piece with the base 16. The front stops 22 and 24 limit movement of the roller 20 in a direction toward the right end of the base 16, as viewed in FIG. 2.

A backstop 26 extends upwardly from the base 16 in a direction generally perpendicular to the chassis 12. The backstop 26 is molded in one piece with the base 16. A set screw 28 is rotatably threaded into the backstop 26. Rotation of the set screw 28 in the backstop 26 sets the initial position of the roller 20 axially along the guide surface 18 of the base 16.

Three metal legs 32, 34, and 36 extend downwardly from the base 16 and are welded to the chassis 12. The legs 32, 34, and 36 are molded into the plastic material of the base 16. The legs 32, 34, and 36 are electrically insulated by the material of the base 16 from the remainder of the sensor 10. The legs 32, 34, and 36 support the base 16 on the chassis 12.

A first metal terminal 40 (FIG. 2) is molded into the material of the base 16. A first end portion of the first terminal 40 forms a tab 42 which extends from an end 44 of the base 16 and is bent downwardly toward the chassis 12. A second end portion of the first terminal 40 forms a weld tab 46 (FIG. 1) which projects from the side 48 of the base 16 and is bent downwardly toward the chassis 12. The weld tab 46 is welded to a pin 50. The pin 50 extends through an opening 52 in the chassis 12. The opening 52 in the chassis 12 is sealed with a glass material which electrically insulates the pin 50 from the chassis 12, secures the pin 50 in position relative to the chassis 12, and hermetically seals the opening 52 in the chassis 12. The pin 50 electrically connects the tab 42 in the sensor 10 to electrical circuitry (not shown) in the vehicle.

A second metal terminal 54, seen only partially in the drawings, is molded into the end 44 of the base 16, on the opposite side of the sensor 10. The second terminal 54 is a mirror image of the first terminal 40. One end portion of the second terminal 54 forms a tab (not shown) which extends from the end 44 of the base 16 and is bent downwardly toward the chassis 12, like the tab 42. A second end portion of the second terminal 54 forms a weld tab 56 (FIG. 2) which projects from the side of the base 16 opposite to the side 48, and is bent downwardly toward the chassis 12. The weld tab 56 is welded to a pin 58 which, like the pin 50, extends through an opening 59 in the chassis 12 sealed with glass material. The pin 58 electrically connects the second terminal 54 to electrical circuitry in the vehicle.

A pair of resilient J-shaped band tensioners 60 and 62 are fixed underneath the opposite end 64 of the base 16. The band tensioner 60 (FIG. 2) has a first portion 66 welded to a third metal terminal 68 molded into the plastic material of the base 16. A curved end portion 70 of the band tensioner 60 extends from the first portion 66. The curved end portion 70 is spaced from the base 16 and projects outwardly of the guide surface 18. The band tensioner 62 (FIG. 1) is identical to the band tensioner 60. The band tensioner 62 is welded to a fourth metal terminal (not shown) molded into the plastic material of the base 16.

A first firing contact 72 projects through a slot 74 in the base 16 and above the guide surface 18. The firing contact 72 is welded underneath the base 16 to a fifth metal terminal 76 molded into the plastic material of the base 16. An end portion of the fifth terminal 76 forms a weld tab 78 which projects from the side 48 of the base 16 and is bent downwardly toward the chassis 12. The weld tab 78 is welded to a pin 80 which, like the pin 50, extends through an opening 82 in the chassis 12 sealed with glass material. The pin 80 electrically connects the firing contact 72 to electrical circuitry in the vehicle.

A second firing contact 84 projects through a slot 86 in the base 16 and above the guide surface 18. The firing contact 84 is welded underneath the base 16 to a sixth metal terminal 88 seen only partially in the drawings which is molded into the plastic material of the base 16. An end portion of the sixth terminal forms a weld tab 90 which projects from the side of the base 30 opposite the side 48 and which is bent downwardly toward the chassis 12. The weld tab 90 is welded to a pin 92 which, like the pin 50, projects through an opening 94 in the chassis 12 sealed with glass material. The pin 92 electrically connects the firing contact 84 with electrical circuitry in the vehicle.

The firing contacts 72 and 84 are made of a flexible conductive material, preferably beryllium copper. The firing contacts 72 and 84 are gold plated on their surfaces which project above the guide surface 18 and face toward the roller 20.

Figure 4:
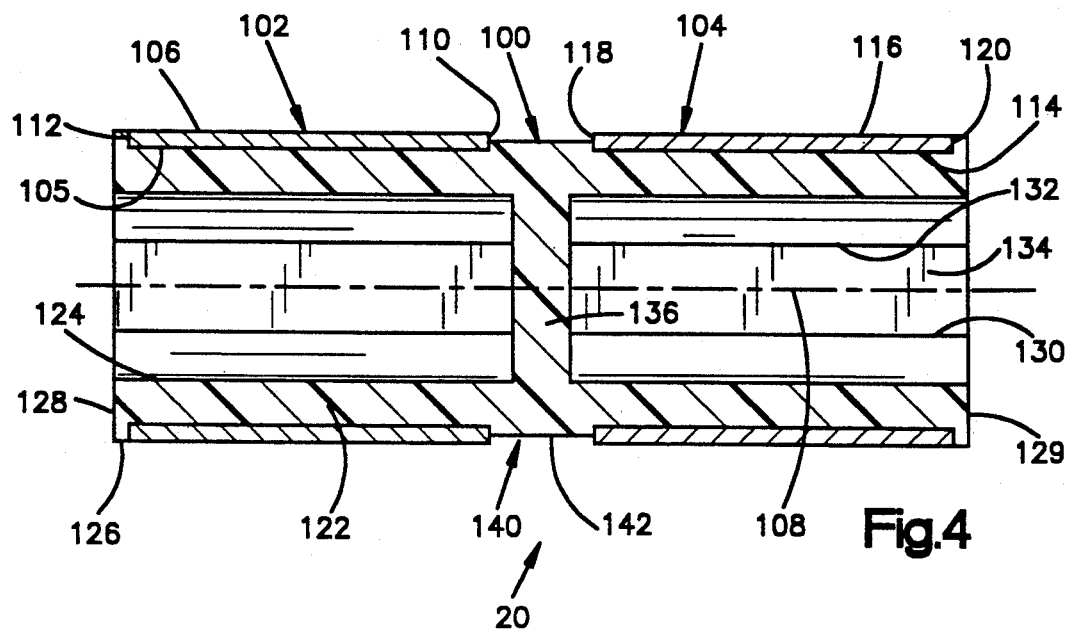
FIG. 4 is a longitudinal sectional view of a roller of the sensor of FIG. 1.

The roller 20 (FIG. 4) has a hollow cylindrical configuration. The roller 20 includes a non-conductive molded plastic insert 100 and a pair of tubular metal caps 102 and 104. The plastic insert 100 is preferably made from 2410 ULTEM ® (polyetherimide 40% glass filled), manufactured by General Electric Plastics. The metal caps 102 and 104 are preferably made from 3094 stainless steel. The roller 20 is insert molded to secure the metal caps 102 and 104 to the insert 100.

The first metal cap 102 has a cylindrical inner surface 105 and a cylindrical outer surface 106 each extending around the central longitudinal axis 108 of the roller 20. Extending between the surfaces 105 and 106, the first metal cap 102 has an annular inner end face 110 and an annular outer end face 112. The second metal cap 104 is identical to the first metal cap 102 and has a cylindrical inner surface 114 and a cylindrical outer surface 116. The second metal cap 104 has an annular inner end face 118 and an annular outer end face 120.

The roller insert 100 includes a tubular wall 122 having an inner circumferential surface 124, an outer circumferential surface 126, and opposed annular outer end faces 128 and 129 extending between the surfaces 124 and 126. Two axially extending edge surfaces 130 and 132 define between them a flat surface 134 on the inside of the insert 100. A circular web 136 is located at the axial center of the roller insert and extends radially outwardly from the roller axis 108 to the circumferential inner surface 124 of the insert 100.

At the outer axial end face 112 of the first metal cap 102, the cylindrical outer surface 106 of the first metal cap 102 is flush with the cylindrical outer surface 126 of the insert 100. Similarly, at the outer annular end face 120 of the second metal cap 104, the cylindrical outer surface 116 of the second metal cap 104 is flush with the cylindrical outer surface 126 of the insert 100. Thus, the first and second metal caps 102 and 104 are blocked from movement axially outwardly on the insert 100.

The plastic insert 100 is smaller in diameter at its axial center than at its axial ends, forming a recessed portion 140. The recessed portion 140 has a cylindrical outer surface 142. The cylindrical outer surface 142 is larger in diameter than the cylindrical inner surfaces 105 and 114 of the metal caps 102 and 104. The metal caps 102 and 104 are thereby blocked from movement axially inwardly on the insert 100. The cylindrical outer surface 142 is smaller in diameter than the cylindrical outer surfaces 106 and 116 of the metal caps 102 and 104. This insures that the metal caps 102 and 104, and not the insert 100, contact the guide surface 18 on the base 16 of the sensor 10. The roller 40 therefore rolls more smoothly and controllably along the guide surface 18, because the metal caps 102 and 104 have a smoother surface finish than is obtainable on a molded plastic piece such as the insert 100.

Figure 3:
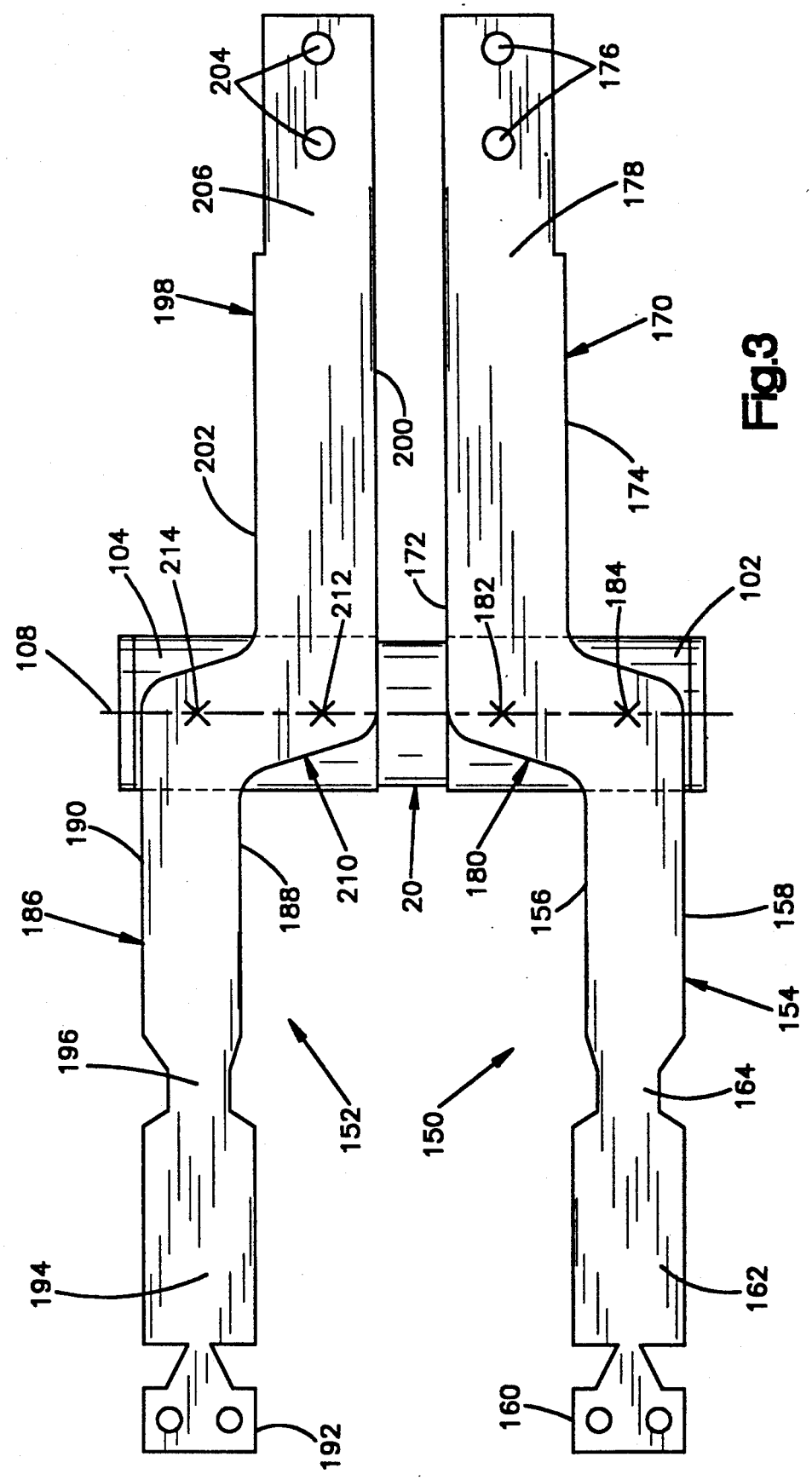
FIG. 3 is a plan view of parts of the sensor of FIG. 1, prior to assembly.

The sensor 10 includes two S-shaped bands 150 and 152, best seen in FIG. 3 which illustrates the attachment of the bands 150 and 152 to the roller 20 prior to assembly in the sensor 10. The bands 150 and 152 are mirror images of each other. The bands 150 and 152 are made of a flexible electrically conductive material, preferably a beryllium nickel alloy about 0.00117 inches thick.

The band 150 includes a first straight portion 154 having an inner edge 156 and an outer edge 158. An assembly tab 160 is attached to an end portion 162 of the first straight portion 154 of the band 150. The first straight portion 154 also includes a tapered region 164 for calibration of the initial biasing force which the band 150 applies to the roller 20. The band 150 has a second straight portion 170 with an inner edge 172 and an outer edge 174. Two locating openings 176 are formed in an end portion 178 of the second straight portion 170.

The first and second straight portions 154 and 170 of the band 150 are joined by a connector portion 180. The connector portion 180 extends at an angle between the first and second straight portions 154 and 170. As can be seen in FIG. 3, the band 150 is spot welded to the first metal cap 102 at two welds 182 and 184 on the connector portion 180 of the band 150. These welded connections are described in more detail below.

The band 152 is a mirror image of the band 150. The band 152 includes a first straight portion 186 having an inner edge 188 and an outer edge 190. An assembly tab 192 is attached to an end portion 194 of the first straight portion 186. The first straight portion 186 also includes a tapered region 196 identical to the tapered region 164 of the band 150.

The band 152 includes a second straight portion 198 having an inner edge 200 and an outer edge 202. Two locating openings 204 are formed in an end portion 206 of the second straight portion 198. The first and second straight portions 186 and 198 of the band 152 are joined by a connector portion 210. The connector portion 210 extends at an angle between the straight portions 186 and 198. As can be seen in FIG. 3, the band 152 is spot welded to the second metal cap 104 on the roller 20 at two welds 212 and 214 on the connector portion 210 of the band. These welded connections are described in more detail below.

In the assembled sensor 10, the end portion 206 of the band 152 is welded to the band tensioner 60 (FIG. 2) underneath the base 16. The openings 204 in the band end portion 206 are aligned with corresponding openings (not shown) in the band tensioner 60 during assembly to aid in positioning the parts. The band 152 extends from the first portion 66 of the tensioner 60 around the curved end portion 70 of the tensioner 60 toward the guide surface 18 of the base 16. The curved end portion 70 of the tensioner 60 directs the band 152 toward the guide surface 18 at an appropriate angle and location.

The second straight portion 198 of the band 152 extends off the curved end portion 70 of the tensioner 60 onto the curved guide surface 18 of the base 16. Overlying the guide surface 18, the second straight portion 198 extends longitudinally along the guide surface 18 toward the roller 20. The second straight portion 198 then extends under the roller 20, curves upwardly and wraps around the first metal cap 102 of the roller 20 as seen in FIG. 1.

The first straight portion 186 of the band 152 completes the wrap around the roller 20 begun by the second straight portion 198 and extends along the guide surface 18 of the base 16 to the other end 44 of the base 16. The first straight portion 186 extends off the curved guide surface 18 of the base 16 onto the tab 42. The end portion 194 of the band 152 is welded to the tab 42. The assembly tab 192, used in tensioning the band 152 before it is welded to the tab 42, is removed after welding.

In a similar manner, the end portion 178 of the band 150 is welded to the band tensioner 62 (FIG. 1) underneath the base 18. The openings 176 in the band end portion 178 are aligned with corresponding openings (not shown) in the band tensioner 62 during assembly to aid in positioning the part. The band 150 extends around a curved end portion of the tensioner 62 toward the guide surface 18 of the guide 16. The curved end portion of the tensioner 62 directs the band 150 toward the guide surface 18 at an appropriate angle and location The second straight portion 170 of the band 150 extends off the curved end portion of the tensioner 62 onto the curved guide surface 18 of the base 16. Overlying the guide surface 18, the straight band portion 170 extends longitudinally along the guide surface 18 toward the roller 20. The straight band portion 170 of the band 150 then extends under the roller 20, curves upwardly and wraps around the outer cylindrical surface of the second metal cap 104 of the roller 20 as seen in FIG. 1.

The first straight portion 154 of the band 150 completes the wrap around the roller 20 begun by the second straight portion 170 and extends along the guide surface 18 of the base 16 to the end 44 of the base 16. The first straight portion 154 extends off the curved guide surface 18 onto the tab (not shown) which is part of the second metal terminal 54. The end portion 162 of the band 152 is welded to the tab. The assembly tab 160, used in tensioning the band 150 prior to welding, is removed after welding.

Figure 2:
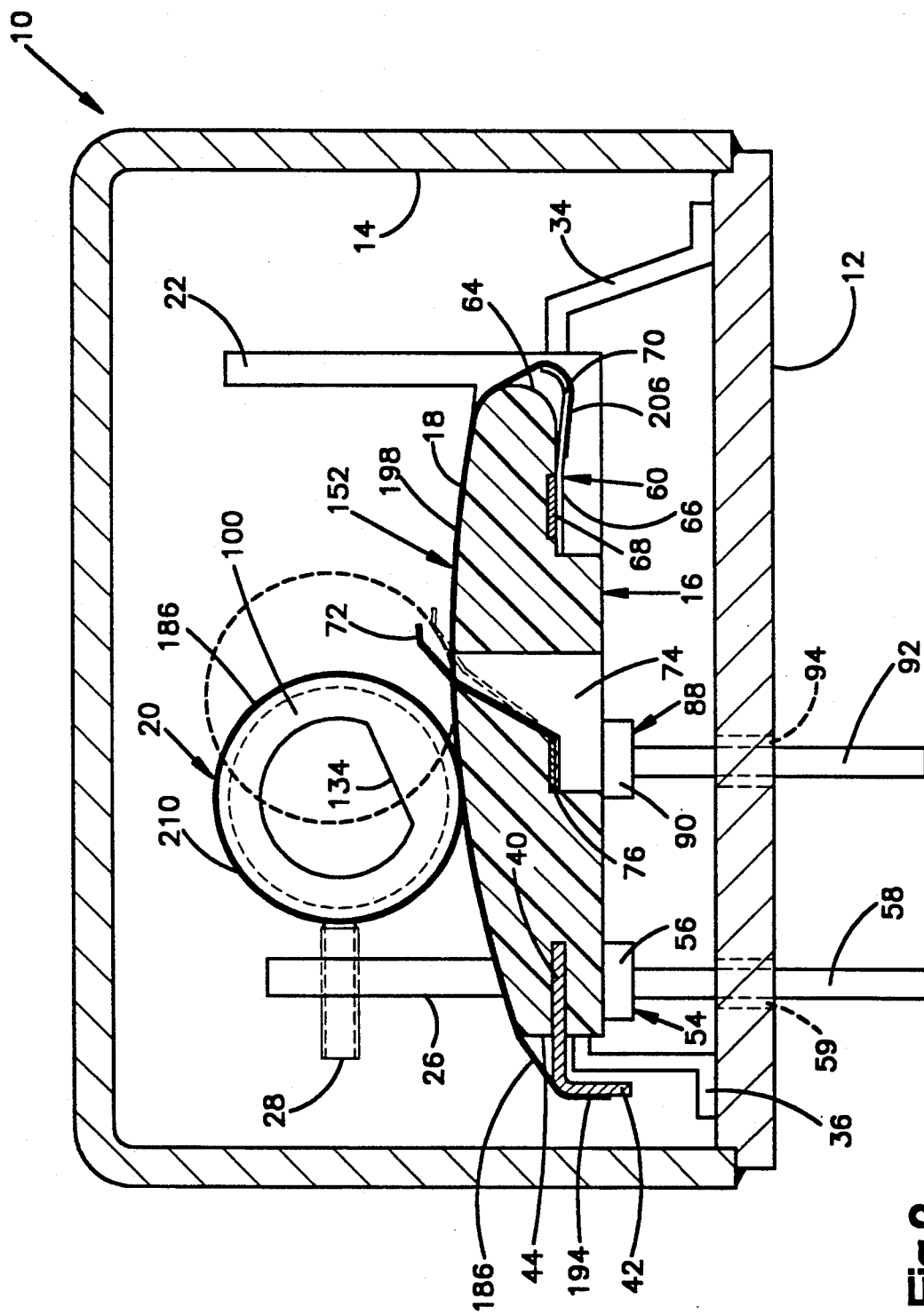
FIG. 2 is a longitudinal sectional view taken along line 2—2 of FIG. 1.

The sensor 10 is designed to be mounted in a vehicle such as an automobile with the roller 20 in an initial position as illustrated in solid lines in FIG. 2. If the sensor 10 is to sense deceleration of a vehicle moving forward, the sensor 10 is mounted with the roller 20 toward the rear end of the vehicle. The roller 20 is spaced from the firing contacts 72 and 84 and is in contact with the set screw 28. The bands 150 and 152 bias the roller 20 toward the set screw 28 in a known manner. Deceleration of the vehicle at a sufficient rate of deceleration for a long enough time interval causes the roller 20 to roll along the guide surface 18 of the base 16 away from the set screw 28 against the bias of the bands 150 and 152. If the roller 20 rolls far enough away from the set screw 28, the first portions 186 and 154 of the bands 152 and 150, respectively, contact the firing contacts 72 and 84, respectively.

Since the firing contact 72 and the band 152 are made of electrically conductive metal, an electrical current can then flow between the firing contact 72 and the band 152. The engagement between the band 152 and the contact 72 completes a circuit between the pins 50 and 80 and permits current to flow between the pins. Similarly, since the firing contact 84 and the band 150 are both made of electrically conductive metal, an electrical current can also flow between the firing contact 84 and the band 150. The engagement between the band 150 and the contact 84 completes a circuit between the pins 58 and 92 and permits current to flow between the pins. These electrical current flows can be used, for example, to actuate one or more vehicle occupant restraints system such as air bags.

Figure 5:
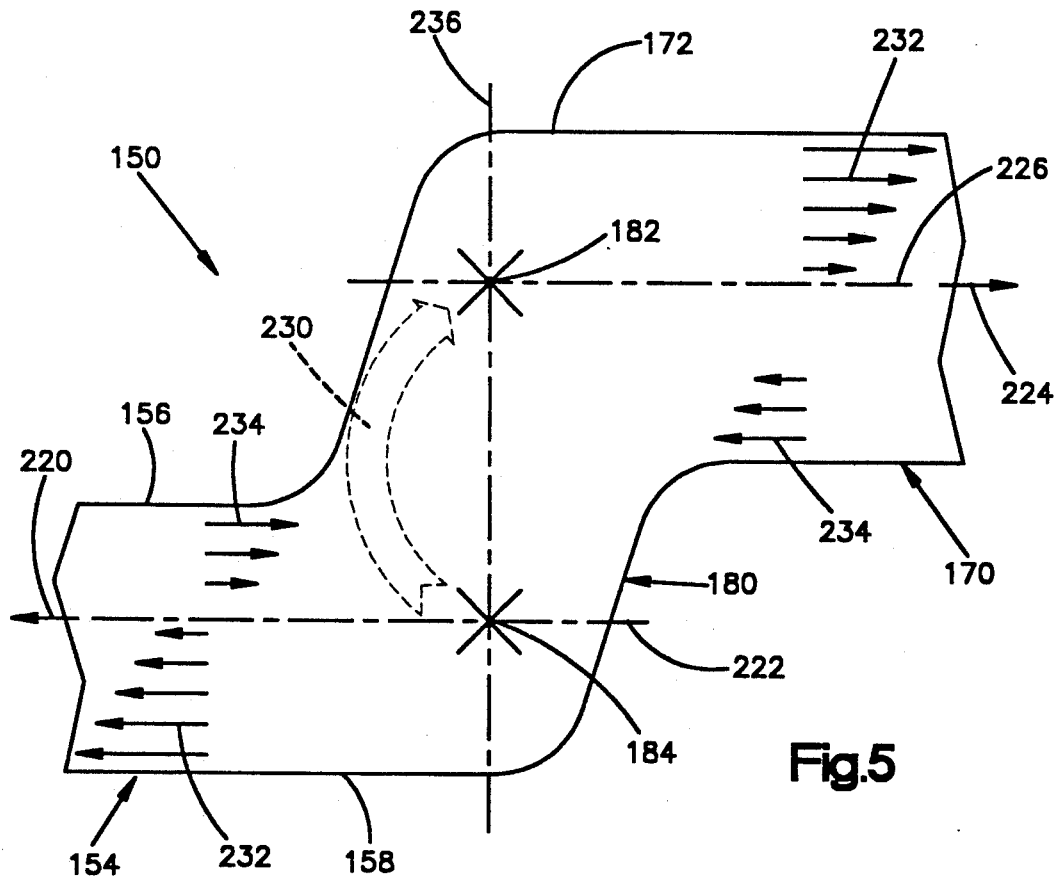
FIG. 5 is a schematic diagram illustrating forces acting on parts of the sensor of FIG. 1.

In accordance with a feature of the present invention, buckling of the bands 150 and 152 is minimized by the welding of the bands 150 and 152 to the roller 20. FIG. 5 illustrates, as an example, the band 150 with its connector portion 180 between the first straight portion 154 and the second straight portion 170. The two straight portions 154 and 170 are parallel but non-collinear. The band is under tension due to forces applied to the ends of the straight portions 154 and 170. The tensile forces on the first straight portion 154 are indicated by the arrow 220 extending along the center line 222 of the first straight portion 154. The tensile forces on the second straight portion 170 are indicated by the arrow 224 extending along the center line 226 of the second straight portion 170.

These tensile forces tend to produce a twisting moment in the angled connector portion 180 the band 150, as illustrated schematically by the arrow 230. The twisting moment can result in compressive forces, as indicated by the arrows 232, on the outer edges of the straight portions of the band 150. This twisting moment can also result in tensile forces, as indicated by the arrows 234, on the inner edges of the straight portions of the band 150. These forces can produce localized buckling of the band 150. If the band 150 buckles, it will not lie flat on the guide surface 18 of the base 16.

To minimize buckling, the band 150, as discussed above, is welded to the metal cap 102 of the roller 20. Similarly, the band 152 is welded to the metal cap 104 of the roller 20. Rigid attachment of the bands 150 and 152 to the roller 20, through welding, directs the twisting moment from the bands into the roller 20. The roller 20 is more massive and stiffer than the bands 150 and 152 and is not affected by the twisting moment. Thus, the effects of the twisting moments on the bands 150 and 152 are minimized sufficiently that they no longer have any significant effect on the performance of the sensor 10.

Each band 150 and 152 is welded to the roller 20 by at least two separate welds. On each band 150 and 152, the welds are preferably located on the angled connector portion of the band, on a line which is parallel to the axis 108 of the roller 20 and which is spaced equally from the straight portions of that band. For example, the welds on the band 150 are preferably located on the angled connector portion 180 of the band 150, on a line 236 which is parallel to the axis 108 of the roller 20 and which is spaced equally from the straight portions 154 and 170 of the band 150. The weld 182 (FIGS. 3 and 5) is preferably located at the intersection of the longitudinal center line 226 of the second straight portion 170 and the line 236. The weld 184 is preferably located at the intersection of the longitudinal center line 222 of the first straight portion 154 and the line 236.

The welds 182 and 184 can be located at other positions along the line 236, and still be effective. The welds have more effect as they are moved closer to the outer edges 158 and 172 of the band 150. However, it is essential to keep any welds far enough away from the edges of the bands to avoid damage to the band edges resulting from the welding process. This sets the practical outward limit of the location of the welds 182 and 184.

The welds 182 and 184 have less effect as they are moved closer to being in line with the inner edges 156 and 174 of the band 150. This diminishing effectiveness sets the practical inward limit of the location of the welds 182 and 184. In a preferred embodiment of the invention, in which the straight portions of the band have a width of about six to seven millimeters, it is desirable to locate each weld at least one millimeter away from a line collinear with the respective inner band edges.

Besides minimizing twisting in the bands 150 and 152, welding the bands 150 and 152 to the roller 20 also aids in assembly of the sensor 10. The bands 150 and 152 are welded to the roller 20 prior to assembly into the sensor 10. The procedure of wrapping the bands 150 and 152 about the roller 20 and fixing them to the base 16 can then be performed automatically, without separation of the bands from the roller 20. The rigid attachment of the bands 150 and 152 to the roller 20 also prevents the roller 20 from sliding out from the wrapped bands 150 and 152, if the assembled sensor 10 is ever dropped on its side.

Forming the roller 20 from a non-conductive plastic insert with a pair of metal caps provides several benefits. The plastic material of the insert 100 constitutes most of the roller 20, and thus the beneficial low mass of a plastic roller is obtained. The metal caps 102 and 104 have a smoother surface finish than is possible with molded plastic, and thus the benefits of a metal roller are obtained. Further, the two bands 150 and 152 are electrically isolated from each other by the nonconductive central portion 140 of the insert 100.

The flat surface 134 molded on the inside of the roller 20 is used in setting the initial position of the roller 20 on the base 16. The process of molding the roller 20 leaves two axially extending mold parting lines on the outer surface of the plastic insert 100. It is important that these parting lines be kept from contact with the calibration set screw 28 lest an incorrect positioning of the roller 20 result. Accordingly, the flat surface 134 is molded on the roller 20 at a known position relative to the parting lines on the roller 20. During assembly of the sensor 10, orienting the flat surface 134 in a specific position sets the position of the parting lines also. Therefore, the position of the parting lines can be known at all times, and the parting lines can be kept from contact with the set screw 28.

It should be noted that the central web 136 (FIG. 4) of the plastic insert 100 of the roller 20 can be made of varying thickness. A preferred molding process by which the roller 20 is formed keeps constant the radial thickness of the tubular wall 122 and the overall length of the plastic insert 100. Accordingly, if it is desired to manufacture a roller 20 of a different mass, the web 136 is made thicker or thinner, in the axial direction, to adjust the overall mass of the roller 20. The web 136 may be absent if the desired mass of the roller 20 is low enough, in which case the roller 20 would be hollow completely through its length.

From the above description of a preferred embodiment of the invention, those skilled in the art will perceive improvements, changes, and modifications in the invention. Such improvements, changes, and modifications within the skill of the art are intended to be covered by the appended claims.

I claim:
1. An apparatus comprising:
   a movable member having a longitudinal axis;

a base having a guide surface defining a path along which said movable member is displaced from a first position to a second position, said axis being displaced along with said movable member;

a band of flexible electrically conductive material which at least partially encircles said movable member about said axis and which is partially displaced with said movable member upon movement of said movable member, said band being welded to said movable member; and an electrically conductive member in the path of displacement of said band at a location spaced from said movable member and said band when said movable member and band are in a first position, said movable member being movable along said guide surface from said first position to a second position in which a portion of said band movable with said movable member contacts said conductive member to complete a circuit for electrical current through said conductive member and said band.

2. Apparatus as defined in claim 1 wherein said movable member is a roller having a non-conductive insert and a conductive metal cap supported on said non-conductive insert, said band being welded to said conductive metal cap of said roller.

3. Apparatus as defined in claim 2 wherein said metal cap comprises a tubular member extending circumferentially around said roller.

4. Apparatus as defined in claim 2 wherein said roller is insert molded to secure said metal cap to said insert.

5. Apparatus as defined in claim 4 wherein said non-conductive insert of said roller includes a web portion selectively molded at a selected thickness to set the mass of said roller.

6. Apparatus as defined in claim 1 wherein said band has opposite ends fixed to said base, said band including a first straight portion extending from the first end of said band toward said movable member, a second straight portion extending from the second end of said band toward said movable member, and an angled connector portion intermediate said first and second straight portions, said angled connector portion of said band being welded to said movable member.

7. A rolamite sensor as defined in claim 1 wherein said band is welded to said movable member at a plurality of locations along a line extending transverse to the longitudinal extent of said band.

8. Apparatus as defined in claim 1 comprising:

a second band of flexible electrically conductive material which at least partially encircles said movable member at a location on said movable member spaced axially from said first band, said second band being partially displaced upon movement of said movable member, said second band being welded to said movable member;

a second electrically conductive member in the path of displacement of said second band at a location spaced from said movable member and said second band when said movable member and second band are in said first position, said movable member being movable along said guide surface from said first position to said second position in which a portion of said second band contacts said second conductive member to complete a second circuit for electrical current through said second conductive member and said second band; and said movable member being a roller having a non-conductive insert and an axially spaced apart pair of conductive metal caps supported on said non-conductive insert, said first band being welded to said first conductive metal cap of said roller and said second band being welded to said second conductive metal cap of said roller.

9. A rolamite sensor comprising:

a roller having a longitudinal axis;

a base having a guide surface defining a path along which said roller is displaced from a first position to a second position, said axis being displaced along with said movable member;

a band of flexible electrically conductive material which at least partially encircles said roller about said axis and which is partially displaced with said roller upon movement of said roller; and an electrically conductive member in the path of displacement of said band at a location spaced from said roller and said band when said roller and band are in a first position, said roller being movable along said guide surface from said first position to a second position in which a portion of said band movable with said roller contacts said conductive member to complete a circuit for electrical current through said conductive member and said band;

said roller comprising a non-conductive plastic insert and a conductive tubular metal cap molded on an outer surface of said non-conductive insert, said band being welded to said metal cap of said roller to attach said band rigidly to said roller.

10. A rolamite sensor as defined in claim 9 wherein said molded non-conductive plastic insert includes positioning means on said insert for rotationally positioning said roller in said sensor.

* * * * *

UNITED STATES PATENT AND TRADEMARK OFFICE
CERTIFICATE OF CORRECTION

PATENT NO. : 5,178,264
DATED : January 12, 1993
INVENTOR(S) : Richard J. Russell, II It is certified that error appears in the above-identified patent and that said Letters Patent is hereby corrected as shown below:

Column 10, Line 28, Claim 9, Change "movable member" to
  --roller--.

Signed and Sealed this

Seventh Day of December, 1993

Attest:

BRUCE LEHMAN

*Attesting Officer*    *Commissioner of Patents and Trademarks*